US012269601B2

United States Patent
Murray

(10) Patent No.: US 12,269,601 B2
(45) Date of Patent: Apr. 8, 2025

(54) AIR PRESSURISATION SYSTEM

(71) Applicant: ROLLS-ROYCE plc, London (GB)

(72) Inventor: Christopher A. Murray, Nottingham (GB)

(73) Assignee: Rolls-Royce PLC, London (GB)

( * ) Notice: Subject to any disclaimer, the term of this patent is extended or adjusted under 35 U.S.C. 154(b) by 57 days.

(21) Appl. No.: 18/163,143

(22) Filed: Feb. 1, 2023

(65) Prior Publication Data

US 2023/0373635 A1   Nov. 23, 2023

(30) Foreign Application Priority Data

Feb. 4, 2022   (GB) ..................... 2201470

(51) Int. Cl.
*F02C 6/08*   (2006.01)
*B64D 13/02*   (2006.01)

(52) U.S. Cl.
CPC ................ *B64D 13/02* (2013.01); *F02C 6/08* (2013.01); *F05D 2220/323* (2013.01)

(58) Field of Classification Search
CPC ........ F05D 2220/323; F02C 6/08; F02C 9/18; B64D 13/08; B64D 13/06
See application file for complete search history.

(56) References Cited

U.S. PATENT DOCUMENTS

| 5,899,085 A | 5/1999 | Williams |
| 2015/0275758 A1 | 10/2015 | Foutch et al. |
| 2015/0314877 A1* | 11/2015 | McAuliffe ............. B64D 13/06 62/61 |
| 2019/0233125 A1* | 8/2019 | Knight ...................... F16H 3/08 |
| 2019/0309683 A1* | 10/2019 | Mackin .................. F02C 7/047 |

FOREIGN PATENT DOCUMENTS

| EP | 2527603 A2 | 11/2012 |
| EP | 2829706 A1 | 1/2015 |
| EP | 3543131 A1 | 9/2019 |
| EP | 3584165 A1 | 12/2019 |
| EP | 3517436 B1 | 5/2020 |
| EP | 3517437 B1 | 5/2020 |

(Continued)

OTHER PUBLICATIONS

Hunt, Commercial airliner environmental control system engineering aspects of cabin air quality, 2000.*

(Continued)

*Primary Examiner* — Todd E Manahan
*Assistant Examiner* — Rodolphe Andre Chabreyrie

(57) ABSTRACT

There is provided an air pressurisation system comprising: a blower compressor coupled to a spool of a gas turbine engine and configured to receive inlet air from a bypass duct of the gas turbine engine; an air treatment apparatus to mix air from the air cycle line with air from the bypass line to control a temperature of air for discharge to an airframe system; and a core bleed line configured to provide a second inlet flow of air from a compressor of the gas turbine engine to the air treatment apparatus in an augmented air supply mode of the air pressurisation system; wherein the core bleed line is configured to provide the second inlet flow of air directly to the bypass line or mix the second inlet flow of air with air from the blower compressor upstream of the bypass line.

17 Claims, 6 Drawing Sheets

(56) References Cited

FOREIGN PATENT DOCUMENTS

EP 3517438 B1 6/2020
EP 3663203 A1 6/2020

OTHER PUBLICATIONS

Hunt, 2000.*
European Search report dated Jun. 16, 2023, issued in EP Patent Application No. 23150237.8.
Great Britain search report dated Aug. 17, 2022, issued in GB Patent Application No. 2201470.8.

* cited by examiner

AIR PRESSURISATION SYSTEM

CROSS-REFERENCE TO RELATED APPLICATIONS

This specification is based upon and claims the benefit of priority from United Kingdom Patent Application No. 2201470.8, filed on 4 Feb. 2022, the entire contents of which are incorporated herein by reference.

BACKGROUND

Technical Field

The present disclosure relates to air pressurisation systems for providing air to an airframe system. The disclosure also concerns an aircraft comprising an airframe and a gas turbine engine, the aircraft comprising an air pressurisation system. The disclosure further relates to a method of providing an air pressurisation system.

Description of the Related Art

It is known to pressurise a cabin of an aircraft using an air pressurisation system which makes use of engine bleed air which is bled from a compressor section of the core of a gas turbine engine. Bleeding high pressure air from the gas turbine engine reduces its efficiency and thereby increases its fuel consumption.

It is therefore desirable to provide an improved air pressurisation system. Air pressurisation systems which make use of air which is taken from a lower pressure source of a gas turbine engine, such as a bypass duct, and which subsequently compress the air prior to delivering it to the cabin are also known. Some exemplary air pressurisation systems are described in EP3517436 B1, EP3517437 B1 and EP3517438 B1.

SUMMARY

According to a first aspect, there is provided an air pressurisation system for an aircraft comprising a blower compressor configured to be mechanically coupled to a spool of a gas turbine engine and configured to receive a first inlet flow of air from a bypass duct of the gas turbine engine; an air treatment apparatus comprising an air cycle line configured to condition air received from the blower compressor; and a bypass line for receiving air from the blower compressor, and configured to bypass the air cycle line. Wherein the air treatment apparatus is configured to mix air from the air cycle line with air from the bypass line to control a temperature of air for discharge to an airframe system. There is also provided an engine core bleed line configured to provide a second inlet flow of air from a compressor of the gas turbine engine to the air treatment apparatus in an augmented air supply mode of the air pressurisation system. Wherein the engine core bleed line is further configured to provide the second inlet flow of air directly to the bypass line or mix the second inlet flow of air with air from the blower compressor upstream of the bypass line.

It may be that the engine core bleed line is configured to provide the second inlet flow of air from the compressor of the gas turbine engine to the air treatment apparatus without passing the second inlet flow of air through a precooler or the blower compressor.

It may be that the engine bleed line is configured to provide a second inlet flow of air from a high pressure compressor of the gas turbine engine to the air treatment apparatus without subjecting the second inlet flow or air to an active cooling process. It may be that the blower compressor is configured to exclusively receive air from the bypass duct of the gas turbine engine.

It may be that the air pressurisation system further comprises a controller configured to control a control valve disposed on the core bleed line and thereby selectively operate the air pressurisation system in the augmented air supply mode in which the valve is open, and an unaugmented air supply mode in which the valve is closed to prevent the second inlet flow of air to the air treatment apparatus.

The controller may be a multi-functional controller for the gas turbine engine configured to control multiple systems of the engine, which may be referred to in the art as an electronic engine controller or EEC.

The controller may be configured to: receive a flow demand signal and to determine whether a flow delivery capacity of the air pressurisation system in the unaugmented mode is sufficient to meet a flow demand corresponding to the flow demand signal; and switch the air pressurisation system into the augmented air supply mode in response to a determination that the flow delivery capacity is insufficient to meet the flow demand.

The controller may be further configured to switch the air pressurisation system into the unaugmented air supply mode in response to a determination that the flow delivery capacity of the air pressurisation mode in the unaugmented air supply mode is sufficient to meet the flow demand.

It may be that the controller is configured to determine whether the flow delivery capacity of the air pressurisation system in the unaugmented mode is sufficient to meet the flow demand signal by reference to a flow delivery capacity model configured to predict the flow delivery capacity based on one or more of a group comprising or consisting of: a rotational speed of the spool of the gas turbine engine; a rotational speed of the blower compressor; a pressure of a flow through the bypass duct of the gas turbine engine; a temperature of the flow through the bypass duct of the gas turbine engine; an altitude of the gas turbine engine; an airspeed of the gas turbine engine.

The pressure of the flow through the bypass duct of the gas turbine engine may be, for example, downstream of a propulsive fan of the gas turbine engine and upstream of a bypass duct port.

It may also be that the air pressurisation system is configured to prevent supply of the second inlet flow of air at an excessive temperature. It may be that the control valve and/or a temperature shut-off valve is disposed on the core bleed line and is configured to close (i) autonomously responsive to receiving air at the excessive temperature and/or (ii) by control of the controller or a dedicated temperature shut-off controller based on a temperature of the second inlet monitored by a core bleed line temperature sensor.

It may be that there is a non-return valve disposed on the bypass line configured to prevent the second inlet flow of air from flowing along the bypass line toward the air cycle line and/or the blower compressor.

The blower compressor may be configured to be mechanically connected to the spool of the gas turbine engine via a variable transmission. The blower compressor may be configured to be mechanically connected to the spool of the gas turbine engine via an electric variator.

The air cycle line may comprise a sequential fluid pathway through: a first heat exchanger, an air conditioning compressor, a second heat exchanger, a reheater, a condenser, a water extractor and an air conditioning turbine mechanically connected to the air conditioning compressor by a shaft. The air conditioning turbine may be mechanically connected to the air conditioning system in a bootstrap arrangement, wherein the shaft may be referred to as a bootstrap shaft.

According to a second aspect there is provided an aircraft comprising an airframe and a gas turbine engine, the aircraft comprising an air pressurisation system according to the first aspect. It may be that the air treatment apparatus is located in the airframe and also that the blower compressor is located in the gas turbine engine. The controller may be located in the gas turbine engine. Further, the temperature shut-off controller may be located in the gas turbine engine.

It may be that the gas turbine engine comprises: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

It may also be that: the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

According to a third aspect, there is provided a method of providing an air pressurisation system in accordance with the first aspect. The method comprises the following. Providing a gas turbine engine comprising a blower compressor mechanically coupled to a spool of the gas turbine engine and configured to receive a first inlet flow of air from a bypass duct of the gas turbine engine. Providing a core bleed line configured to receive a second inlet flow of air from a compressor of the gas turbine engine. Connecting the blower compressor and the core bleed line to an air treatment apparatus of an airframe. The air treatment apparatus comprising an air cycle line configured for conditioning air from the blower compressor; a bypass line for receiving air from the blower compressor, and configured to bypass the air cycle line. Wherein the air treatment apparatus is configured to mix air from the air cycle line with air from the bypass line to control a temperature of air for discharge to an airframe system. Wherein the blower compressor and the core bleed line are connected so that the air cycle line is configured to condition air received from the blower compressor and the second inlet flow of air is provided to the air treatment apparatus without passing through a precooler or the blower compressor in an augmented supply mode of the air pressurisation system. Such that the second inlet flow of air is provided directly to the bypass line or the second inlet flow of air is mixed with air from the blower compressor upstream of the bypass line and provided to the air cycle line.

It may be that the method further comprises providing a controller configured to selectively control a control valve on the core bleed line to selectively operate the air pressurisation system in: the augmented air supply mode in which the control valve is open, and an unaugmented air supply mode in which the control valve is closed to prevent flow of the second inlet flow of air to the air treatment apparatus.

The gas turbine engine may also be provided with any feature of the air pressurisation system in accordance with the first aspect which is outside of the air treatment apparatus (which may be located on the airframe).

In the alternative in which the core bleed line is connected to the air treatment apparatus so that the second inlet flow of air is provided directly to the bypass line, it may be that the method further comprises providing a non-return valve to the bypass line configured to prevent the second inlet flow of air from flowing along the bypass line toward the air cycle line and/or the blower compressor.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided.

By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
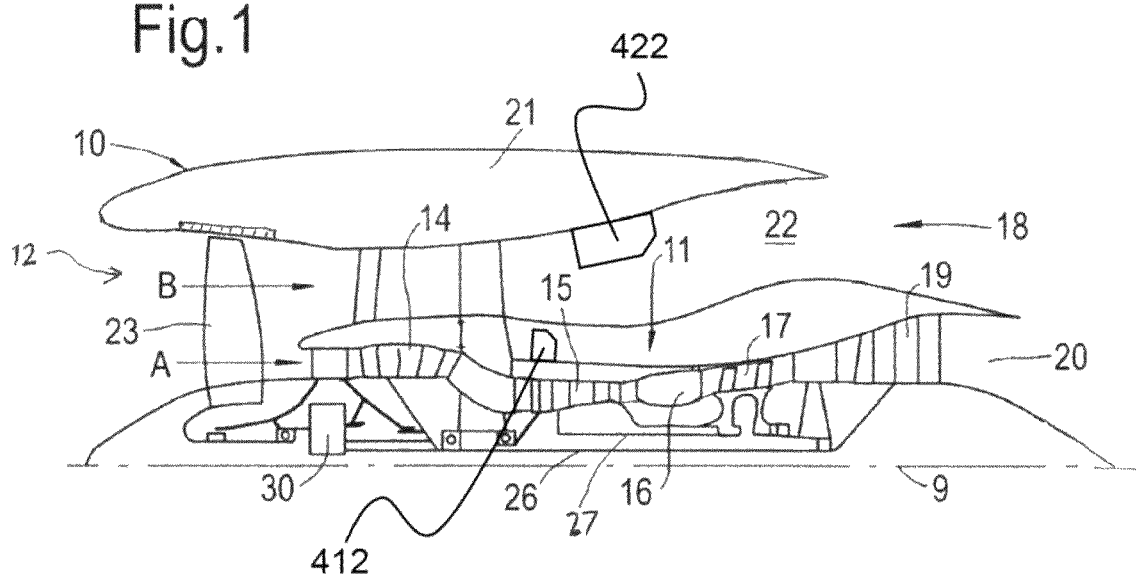
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The bypass duct 22 may comprise an engine bypass duct port 422 for supplying air from the bypass duct to an air pressurisation system or the like. The engine core 11 may also comprise an engine core port 412 for supplying air from a compressor stage of the engine core 11 (such as the low pressure compressor 14 or the high-pressure compressor 15) to an air pressurisation system or the like. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
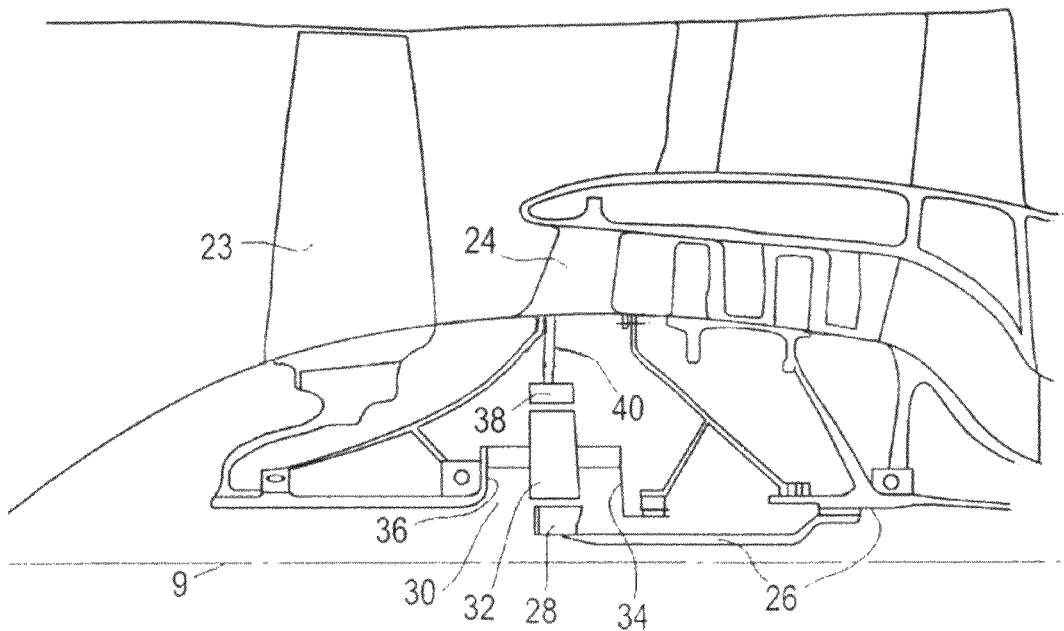
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
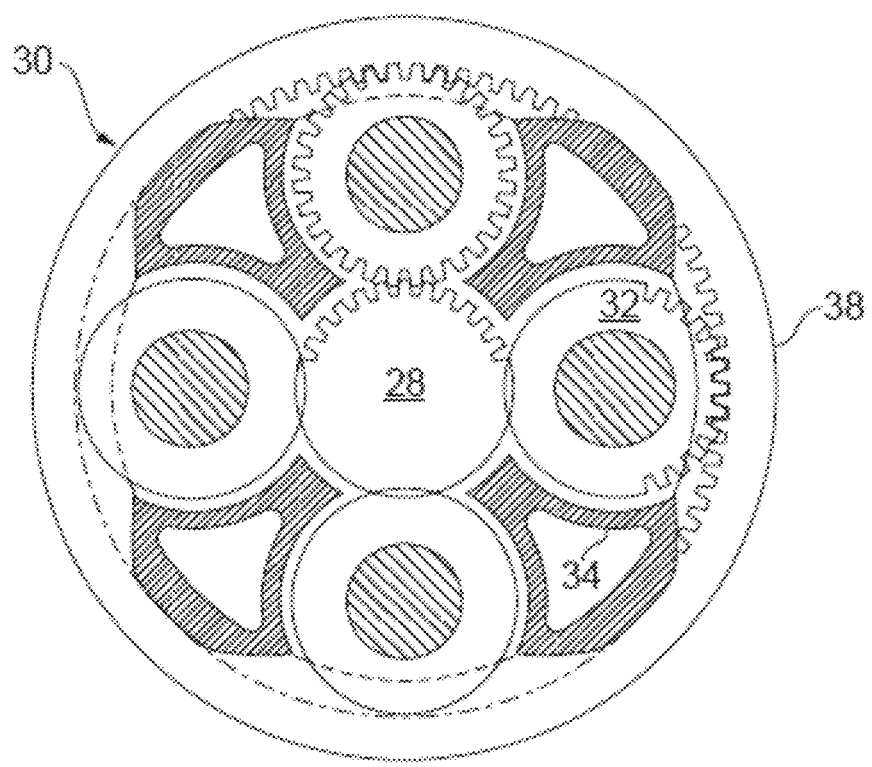
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
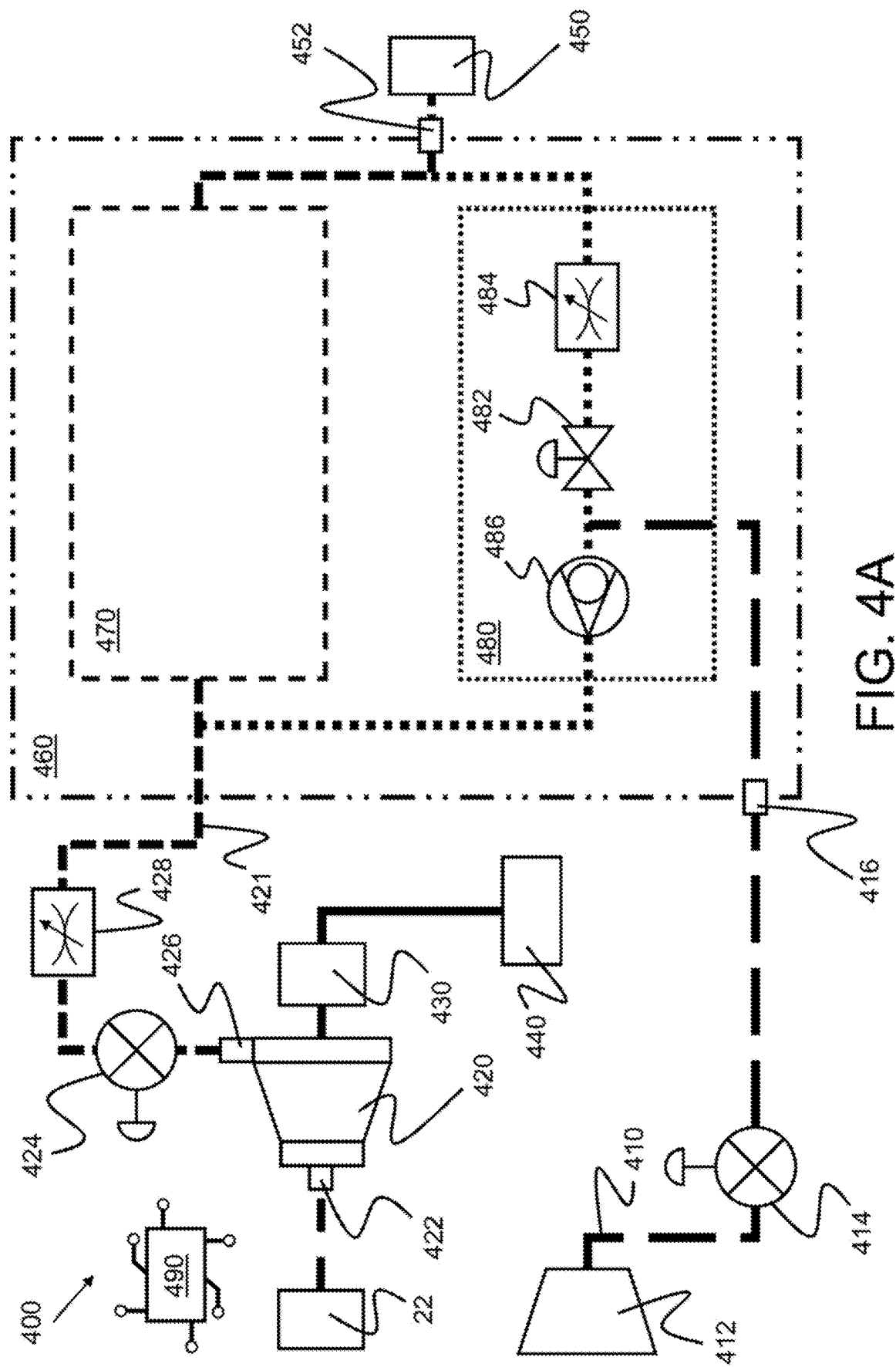
FIG. 4A shows a first example air pressurisation system for supplying air to an airframe system.
Figure 4B:
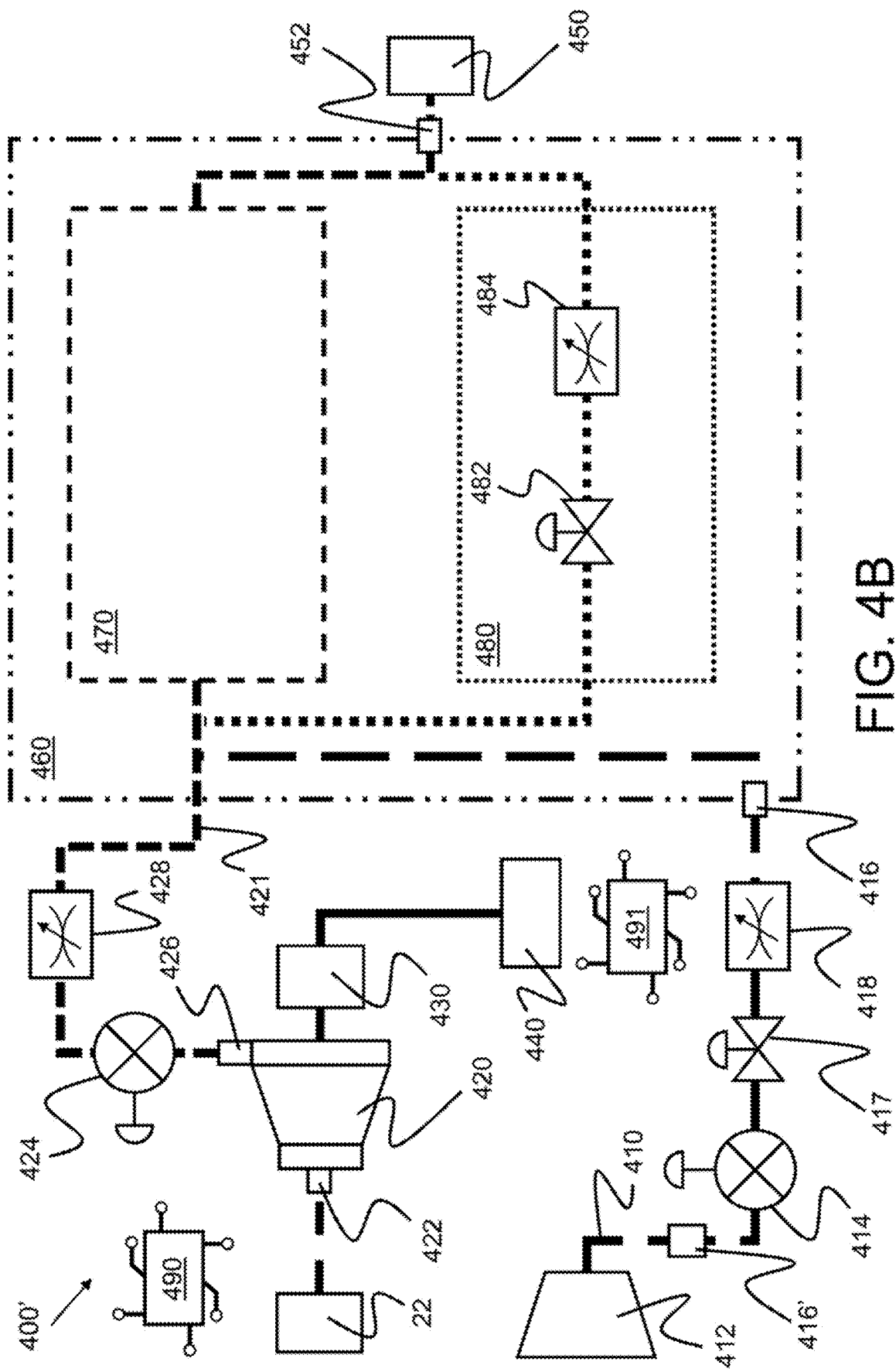
FIG. 4B shows a second example air pressurisation system for supplying air to an airframe system.

A diagram of a first example air pressurisation system 400 for supplying air to an airframe system 450 is shown schematically in FIG. 4A. The air pressurisation system 400 comprises a blower compressor 420 configured to be mechanically coupled to a spool 440 of a gas turbine engine. The expression "spool" is used herein to denote a shaft of the engine which interconnects a compressor and a turbine of the engine core, and/or engine components which rotate together with such an engine shaft (e.g., the compressor and turbine interconnected by the shaft, and associated rotating components such as drums and disks). In the example of FIGS. 4A and 4B, the air pressurisation system 400 comprises a variable transmission 430 for mechanically coupling the blower compressor 420 to the spool 440.

The variable transmission 430 allows a rotational speed of the blower compressor 420 to be decoupled from a rotational speed of the spool 440, so that a performance of the air pressurisation system 400 is not solely governed by an operating speed of the gas turbine engine (e.g., it can be controlled to operate at a target speed independent of the rotational speed of the spool, and/or at a variable speed ratio relative to the rotational speed of the spool). Inclusion of a variable transmission 430 within the air pressurisation system 400 therefore provides more versatile and adaptable means for supplying pressurised air to an airframe system. Various suitable variable transmission types will be apparent to those of ordinary skill in the art. For example, the variable transmission 430 may comprise an electric variator, as described in EP 3517436 B1.

The blower compressor 420 is configured to be driven to rotate by the spool 440 to draw a first inlet flow of air from an engine bypass duct port 422 and to discharge air to an airframe discharge port 426 for supply to an airframe system 450 via an air treatment apparatus 460 for an airframe air use (i.e., a particular application or purpose for which the air is supplied to the airframe). The airframe air use may be, for example, aircraft pressurisation or cargo bay smoke eradication. The blower compressor 420 is generally configured to compress the first inlet flow of air by converting kinetic energy of the first inlet flow of air into pressure energy and heat energy. The blower compressor 420 may be any suitable type of compressor. As shown in the examples of FIGS. 4A and 4B, the blower compressor 420 may preferably be a centrifugal compressor.

The engine bypass duct port 422 is in fluid communication with a bypass duct 22 of the gas turbine engine. Accordingly, the blower compressor 420 is configured to receive the first inlet flow of air from the bypass duct 22 of the gas turbine engine. The blower compressor 420 is further configured to supply the first inlet flow of air to the airframe system 450 via the air treatment apparatus 460, for example to pressurise an aircraft cabin. The first inlet flow of air is conveyed from the blower compressor 420 to the air treatment apparatus 460 through a blower compressor discharge line 421. The first inlet flow of air may be subject to over-pressure regulation and/or flow control prior to supply to the air treatment apparatus 460. In the examples of FIGS. 4A and 4B, the blower compressor discharge line 421 comprises a blower compressor over pressure shut off valve (OPSOV) 424 and a blower compressor flow control valve (FCV) 428 for these purposes.

The air treatment apparatus 460 in turn comprises an air cycle line 470 and a bypass line 480. The air cycle line 470 is configured to condition air received from the blower compressor 420, for example by cooling and/or dehumidifying air received from the blower compressor 420. In other words, a flow of air through the air cycle line 470 is subject to active conditioning therein so as to change (e.g., reduce) a temperature, a pressure and/or a humidity of the flow of air prior to supply to the airframe system 450. The air cycle line 470 may comprise, for instance, an air conditioning fan, an air conditioning compressor, an air conditioning turbine, one or more heat exchangers, a condenser, a water extractor and/or a reheater. An example internal configuration of the air cycle line 470 is described with respect to FIG. 5 below.

The bypass line 480 is configured to bypass the air cycle line 470 such that air received from the blower compressor 420 and conveyed through the bypass line 480 is not subject to active conditioning therein prior to supply to the airframe system 450. For example, the flow of air through the bypass line may not be subject to heat exchange at a heat exchanger, or humidification/de-humidification. The first inlet flow of air drawn from the engine bypass duct port 422 by the blower compressor 420 is conveyed through either the air cycle line 470 or the bypass line 480 within the air treatment apparatus 460 prior to supply to the airframe system 450. The air treatment apparatus 460 is configured to mix air from the air cycle line 470 with air from the bypass line 480 prior to combining the flows for discharge to the airframe system 450. Such mixing may be controlled by a controller of the air treatment apparatus based on a monitored temperature of the combined flow for discharge to the airframe system, for example based on an output of a temperature sensor monitoring the combined flow (e.g., a temperature sensor 452 as shown in FIG. 4A).

In the example of FIGS. 4A and 4B, the bypass line 480 comprises a bypass line pressure regulating valve (PRV) 482 and a bypass line flow control valve (FCV) 484. The bypass line PRV 482 is configured to regulate a pressure of air in the bypass line 480 prior to mixing with air from the air cycle line 470 for supply to the airframe system 450, to prevent supply of air at an excessively high pressure. The bypass line PRV 482 is configured to ensure that the pressure of air in the bypass line 480 downstream of the bypass line PRV 482 is no greater than an air supply pressure threshold associated with the airframe system 450. The air supply pressure threshold of the airframe system 450 may be dependent on by the airframe air use for which air is supplied to the airframe system. For instance, when the air pressurisation system 400 is required to supply air to the airframe system 450 for a cabin pressurisation purpose, the airframe system 450 may supply air directly to a cabin of an aircraft. If so, the air supply pressure threshold of the airframe system may be approximately 1 atm or approximately 1 bar (approximately 100 kPa). Accordingly, the bypass line PRV 482 may be configured to ensure that the pressure of air in the bypass line 480 downstream of the bypass line PRV 482 is no more than approximately 1 atm or approximately 1 bar (approximately 100 kPa).

The bypass line FCV 484 is configured to control a flow rate (e.g., a mass-flow rate or a volumetric flow rate) of air in the bypass line 480. The air treatment apparatus 460 (for example, a controller of the air treatment apparatus 460) is configured to actuate the bypass line FCV 484 so as to control the flow rate of air in the bypass line 480 which is subsequently mixed with air from the air cycle line 470, to target a temperature of the combined flow for discharge to the airframe system. When the bypass line FCV 484 is in a fully closed state, no air flows through the bypass line 480 such that all of the first inlet flow of air drawn from the engine bypass duct port 422 by the blower compressor 420 is conveyed through the air cycle line 470. When the bypass line FCV 484 is in a fully open state, a maximum fraction of the first inlet flow of air drawn from the engine bypass duct port 422 by the blower compressor 420 is conveyed through the bypass line 480 and a remaining fraction of the first inlet flow of air drawn from the engine bypass duct port 422 is conveyed through the air cycle line 470.

The bypass line FCV 484 may be actuated through a plurality of intermediate states between the fully closed state and the fully open state to control a fraction of the first inlet flow of air being conveyed through the bypass line 480 (and thereby also to control a fraction of the first inlet flow of air being conveyed through the air cycle line 470).

The airframe system 450 may be configured or rated to receive an air supply which has a temperature that is greater than a lower airframe system air temperature threshold and/or lower than an upper airframe system air temperature threshold. The respective airframe system air temperature thresholds may be dictated by, for example, a temperature demand of the airframe system 450 for a cabin pressurisation purpose (as may be specified by a cabin climate controller), or by safe operating temperatures for components which convey the air flow. The lower airframe system air temperature threshold may be, for example, 10° C. or 0° C., and the upper airframe system air temperature may be, for example, 260° C., 240° or 200° C. It may be that there are different thresholds that can be permitted for different durations. For example, there may be a short-duration transient threshold of 260° C. (e.g., permitted for no more than 5 seconds), and a steady state threshold of 200° C.

In typical use, air from the air cycle line 470 has a lower temperature than air from the bypass line 480. In particular, it may be that a temperature of air from the air cycle line 470 prior to mixing with air from the bypass line 480 is below the lower airframe system air temperature threshold. In contrast, it may be that a temperature of air from the bypass line 480 prior to mixing with air from the air cycle line 470 is greater than 200° C.

Because the air treatment apparatus 460 mixes air from the air cycle line 470 with air from the bypass line 480 prior to discharge to the airframe system 450, a temperature of air supplied to the airframe system 450 is a function of the temperature and the flow rate (e.g., the mass flow rate) of air received from the air cycle line 470 and the temperature and the flow rate (e.g., the mass flow rate) of air received from the bypass line 480. As discussed above, the air treatment apparatus 460 is configured to mix air from the air cycle line 470 with air from the bypass line 480 to control the temperature of air for discharge to the airframe system 450, by controlling the bypass line flow control valve 484.

The air pressurisation system 400 further comprises a core bleed line 410 configured to provide a second inlet flow of air from a compressor 412 of a core of the gas turbine engine to the air treatment apparatus 460 in an augmented air supply mode of the air pressurisation system 400. The core bleed line 410 comprises a core bleed control valve 414. In this example, the core bleed control valve is a solenoid actuated pressure-regulating valve. Further, in the example of FIG. 4A, the core bleed control valve 414 is shown as being disposed outside of the air treatment apparatus 460, for example it may be located in the gas turbine engine. However, in other examples the core bleed control valve 414 may be actuated by another type of actuator.

The second inlet flow of air does not pass through the blower compressor 420 prior to being provided to the air treatment apparatus 460 by the engine core bleed line 410, nor is it subject to any further active compression process prior to being supplied to the air treatment apparatus 460. The second inlet flow of air does not pass through a precooler device prior to being provided to the air treatment apparatus 460 by the engine core bleed line 410, nor is it subject to any other kind of active cooling process (i.e., through a dedicated heat exchanger) prior to being supplied to the air treatment apparatus 460.

In an unaugmented air supply mode of the air pressurisation system 400 in which a flow demand of the airframe system 450 is met by the first inlet air flow through the cabin blower, the core bleed control valve 414 is fully closed which prevents air being conveyed through the engine core bleed line 410. Accordingly, in the unaugmented air supply mode, the second inlet flow of air from the compressor 412 is not provided to the air treatment apparatus 460 and the air treatment apparatus 460 (and therefore the airframe system 450) is supplied exclusively with the first inlet flow of air drawn from the bypass duct 22 of the gas turbine engine by the blower compressor 420.

The airframe system 450 is associated with a flow demand for air (e.g., a mass-flow rate demand). The flow demand of the airframe system 450 may be dictated by the airframe air use for which air is supplied to the airframe system. Under certain operating conditions, a flow delivery capacity of the air pressurisation system 400 may not be sufficient to meet the flow demand of the airframe system 450 in the unaugmented air supply mode. The air pressurisation system 400 further comprises a controller 490.

The controller 490 is configured to control the core bleed control valve 414 and thereby selectively operate the air pressurisation system 400 in the augmented air supply mode in which the core bleed control valve 414 is open and in the unaugmented air supply mode in which the core bleed control valve 414 is closed. The controller 490 may be configured to receive a flow demand signal which corresponds to the flow demand of the airframe system 450. The flow demand signal may be received from, for example, the airframe system 450. The controller 490 may be a multi-functional controller configured to control multiple systems of the gas turbine engine, which may be referred to in the art as an electronic engine controller (EEC).

The controller 490 may be configured to determine whether a flow delivery capacity of the air pressurisation system 400 is sufficient to meet the flow demand of the airframe system 450 when the air pressurisation system is in the unaugmented mode. If the controller 490 determines that the flow delivery capacity of the air pressurisation system 400 is insufficient to meet the flow demand of the airframe system 450 when the air pressurisation system 400 is in the unaugmented air supply mode, the controller 490 switches the air pressurisation system 400 into the augmented air supply mode by opening the core bleed control valve 414. Switching to the augmented air supply mode may be conditional on the controller 490 that the temperature of the air in the engine core bleed line is at or below an upper threshold temperature (as described above). Switching to the augmented air supply mode may be prevented if the temperature of air for supply along the engine core bleed line is greater than the upper threshold.

Conversely, if the controller 490 determines that the flow delivery capacity of the air pressurisation system 400 is sufficient to meet the flow demand of the airframe system 450 when the air pressurisation system 400 is in the unaugmented air supply mode, the controller 490 switches the air pressurisation system 400 into the unaugmented air supply mode by closing the core bleed control valve 414.

In the augmented air supply mode, the second inlet flow of air is provided to the air treatment apparatus 460 which is mixed with the first inlet flow of air prior to being supplied to the airframe system 450. As a result, a flow rate of the second inlet flow of air augments or supplements a flow rate of the first inlet flow of air in the augmented air supply mode to provide a total flow rate provided to the airframe system 450 by the air treatment apparatus 460 (e.g., a total mass-flow rate).

In various examples, the flow delivery capacity of the air pressurisation system 400 may be predicted using a flow delivery capacity model. The flow delivery capacity model may be configured to predict the flow delivery capacity of the air pressurisation system in the unaugmented mode based on at least one parameter on which the flow delivery capacity of the air pressurisation system 400 depends. The at least one parameter is selected from a group consisting of: a rotational speed of the spool of the gas turbine engine, a rotational speed of the blower compressor, a pressure of a flow though the bypass duct of the gas turbine engine, a temperature of the flow through the bypass duct of gas turbine engine, an altitude of the gas turbine engine and/or an airspeed of the gas turbine engine.

The rotational speed of the spool of the gas turbine engine, the rotational speed of the blower compressor, the pressure of the flow though the bypass duct of the gas turbine engine, and/or the temperature of the flow through the bypass duct of gas turbine engine may each be monitored using sensors of the gas turbine engine. The pressure of the flow through the bypass duct of the gas turbine engine may be monitored at a location, for example, downstream of a propulsive fan of the gas turbine engine and upstream of the bypass duct port 422. The altitude of the gas turbine engine and/or the airspeed of the gas turbine engine may be monitored parameters which are monitored by dedicated respective sensors which are provided to the gas turbine engine. Otherwise, the altitude of the gas turbine engine and/or the airspeed of the gas turbine engine may be determined by the controller 490 based on respective signals received from the airframe system 450.

In some examples, the flow delivery capacity of the air pressurisation system 400 may be directly monitored using a flow rate sensor in the air pressurisation system or in the airframe system 450, to monitor an actual flow rate of air delivered in the unaugmented mode. For example, the flow delivery capacity may be monitored using a flow rate sensor located at the same position as the temperature sensor 452, as shown in the example of FIG. 4A.

In the example of FIG. 4A, the engine core bleed line 410 is configured to provide the second inlet flow of air directly to the bypass line 480 of the air treatment apparatus 460 downstream of a bypass line non-return valve (NRV) 486. When the air pressurisation system 400 switches to the augmented air supply mode, the opening of the core bleed line control valve 414 causes a pressure of air downstream of the bypass line NRV 486 to rise above a pressure of air upstream of the bypass line NRV 486 such that the bypass line NRV 486 closes and the bypass line 486 is fed with the second inlet flow of air from the compressor 412 supplied by the engine core bleed line 410, rather than the first inlet flow of air from the blower compressor 420. In other words, the NRV 486 is configured to prevent the second inlet flow of air from flowing along the bypass line 480 toward the blower compressor 420 and/or the air cycle line 460. The core bleed control valve 414 and/or the core bleed line (e.g., a cross-sectional flow area) may be configured to prevent the second inlet flow being provided to the air treatment apparatus 460 at an excessive pressure. For example, the core bleed control valve 414 may be configured to permit the second inlet flow therethrough at a maximum pressure setting which may be, for example, approximately 30 psia (approximately 200 kPa). The maximum pressure may be the same as a maximum pressure that can be delivered from the blower compressor. The maximum pressure may be slightly higher than the maximum pressure that can be delivered from the blower compressor, to ensure that the non-return valve on the bypass line can be closed in the augmented mode.

The airframe system draws 450 a combined mass flow rate from the first inlet flow and the second inlet flow according to the flow demand, with the air treatment apparatus 460 determining the mix of the first inlet flow and the second inlet flow (provided into the bypass line) based on the temperature-based control as described above. The contribution of the second inlet flow of air to the total flow rate of air provided to the airframe system 450 via the bypass line 480 be up to 5% of the total flow rate of air (e.g., of the total mass-flow rate), up to 10% of the total flow rate of air, or more.

The air pressurisation system 400 may further comprise a core bleed line temperature sensor 416. The core bleed line temperature sensor 416 is configured to monitor a temperature of the second inlet flow of air. In the example of FIG. 4A, the core bleed line temperature sensor 416 is shown at a location on the engine core bleed line 410 downstream of the core bleed line control valve 414. However, it will be appreciated that the core bleed line temperature sensor 416 may be positioned at any suitable location within the air pressurisation system 400 so as to generate a signal indicative of the temperature of the second inlet flow of air.

The controller 490 or a dedicated temperature shut-off controller (not shown) may be configured to determine whether the temperature of the second inlet flow of air is excessive. Such a temperature shut-off controller may be located in the gas turbine engine. The temperature of the second inlet flow of air may be determined to be excessive, for example, when the temperature of the second inlet flow of air exceeds a tolerance limit of the components of the air treatment apparatus 460 or when the temperature of the second inlet flow of air exceeds a tolerance limit of a structure through which the core bleed line 410 passes, such as an internal airframe duct. In response to a positive determination that the temperature of second inlet flow of air is excessive, the respective controller is configured to prevent supply of the second inlet flow of air to the air treatment apparatus 460.

In the example of FIG. 4A, the respective controller is configured to restrict the supply of the second inlet flow of air by closing the core bleed line control valve 414, which may be a pressure regulating and shut-off valve (PROSV). However, in other examples, the temperature shut-off controller or the controller 490 may prevent supply of the second inlet flow of air to the air treatment apparatus 460 by other means, for example by using a dedicated shut-off valve disposed on the engine core bleed line 410. The core bleed line control valve 414 may comprise a passive and reversible thermal shut-off arrangement. The passive and reversible thermal shut-off arrangement may comprise, for example, a eutectic link. In such examples, the controller 490 and temperature sensor 416 may still be configured to provide shut-off control (e.g., as a redundant system), or otherwise the controller 490 may not be configured to determine whether the temperature of the second inlet flow is excessive and there may be no core bleed line temperature sensor 416, but rather the passive thermal shut-off arrangement provided to the core bleed line control valve 414 is relied upon to prevent supply of the second inlet flow of air to the air treatment apparatus 460 when the temperature of the second inlet flow of air is excessive.

A diagram of a second example air pressurisation system 400' for supplying air to an airframe system 450 is shown schematically in FIG. 4B. The second example air pressurisation system 400' shown in FIG. 4B is similar to the air pressurisation system 400 shown in FIG. 4A, with like reference numerals being used to indicate common features.

However, in the example of FIG. 4B, the engine core bleed line 410 is configured to mix the second inlet flow of air with the first inlet flow of air from the blower compressor 420 at a location upstream of a bifurcation between the air cycle line and the bypass line 480. Accordingly, in this example, a non-return valve is not provided within the bypass line 480. However, the second inlet flow of air may be subject to over-pressure regulation prior to mixing with the first inlet flow of air. For these purposes, in the example of FIG. 4B, the engine core bleed line 410 further comprises a core bleed line PRV 417 and a core bleed line FCV 418. The engine core bleed line PRV 417 is configured to regulate a pressure of air in the engine core bleed line 410 (i.e., the second inlet flow of air) prior to mixing with air at the location upstream of the bypass line 480, for example to the air supply pressure threshold as described above. The core bleed line FCV 418 is configured to control a flow rate (e.g., a mass-flow rate or a volumetric flow rate) of air in the core bleed line 480. The mixed flow of air which is the result of mixing the first inlet flow of air and the second inlet flow of air is then split between the air cycle line 470 and the bypass line 480 according to the operation of the air treatment apparatus 460 as described above with respect to FIG. 4A.

In use, the second inlet flow of air may be passively cooled within the core bleed line 410 between the compressor 410 and the air treatment apparatus 460. In particular, it may be that the engine core bleed line 410 extends along a significant length before providing the second inlet flow of air to the air treatment apparatus 460. Accordingly, a temperature of the second inlet flow of air at a location upstream of the core bleed control valve 414 may be higher than a temperature of the second inlet flow of air at a location downstream of the core bleed control valve 414. In both the examples of FIGS. 4A and 4B, the core bleed line temperature sensor 416 may alternatively be located upstream of the core bleed control valve 414 (shown at reference numeral 416') so as to protect the core bleed control valve 414 from adverse effects associated with an excessive temperature of the second inlet flow of air.

In use, it may be that the blower compressor 420 is sized to draw a significant volume of air from the engine bypass duct 22 according to predicted demand. For example, under certain operating conditions in which the gas turbine engine is operating at a relatively low power and where the flow demand of the aircraft system 450 is relatively high, the blower compressor 420 may be required to draw and compress a large volume of air through the engine bypass duct port 422 for supply to the airframe system 450. However, under such operating conditions, an ambient pressure of air within the engine bypass duct 22 may be relatively low and so the blower compressor 420 would have to operate at a relatively high speed in order to meet the flow demand of the airframe system 450. Accordingly, if the system were to only operate in the unaugmented mode, the blower compressor 420 would have to be sized in order to adequately meet a peak demand of the airframe system throughout an operating map of operating conditions for use, or an operating envelope of the airframe system may be curtailed.

Both the first example air pressurisation system 400 and the second example air pressurisation system 400' allow the air from the first inlet flow of air to be combined with air from the second inlet flow of air for supply to the airframe system 450 in the augmented air supply mode. According, the air pressurisation system 400, 400' allows the first inlet flow of air from the bypass duct 22 to be augmented or supplemented with the second inlet flow of air from the core of the gas turbine engine in the augmented air supply mode. As a result, the blower compressor 420 may not be required to draw and compress such a large volume of air through the engine bypass duct port 422 in the augmented air supply mode. Therefore, the blower compressor 420 may have a smaller size than would otherwise be required to meet a peak flow demand of the airframe system 450 for the same operating map of operating conditions. The smaller size of the blower compressor 420 may reduce a weight of the air pressurisation system 400, 400' and improve ease of installation within an aircraft and/or a gas turbine engine.

In addition, both the example air pressurisation systems described with respect to FIGS. 4A and 4B provide these advantages without the need for active cooling apparatus to be provided on, for example, the engine core bleed line 410. Active cooling apparatus is associated with additional complexity, size and weight of an air pressurisation system, and the example air pressurisation systems 400, 400' described above provide further technical advantages in that such apparatus need not be included.

Figure 5:
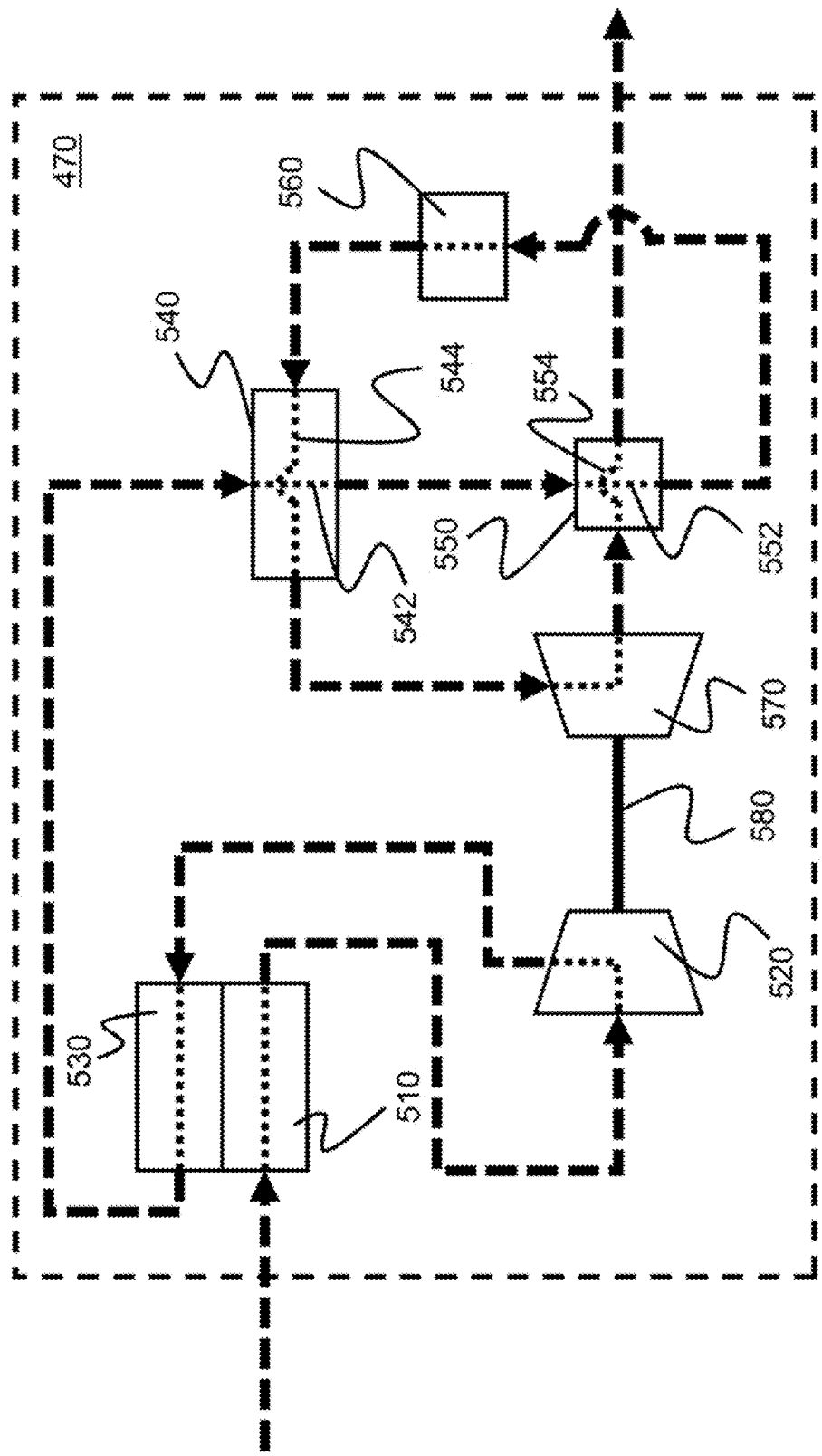
FIG. 5 shows an example air cycle line suitable for use in the first example air pressurisation system of FIG. 4A and/or the second example air pressurisation system of FIG. 4B.

FIG. 5 shows an example air cycle line 470 suitable for use in the first example air pressurisation system 400 of FIG. 4A and/or the second example air pressurisation system 400' of FIG. 4B. The example air cycle line 470 comprises a sequential fluid pathway for a flow of air provided to the air cycle line 470 through a first heat exchanger 510, an air conditioning compressor 520, a second heat exchanger 530, a first channel 542 of a reheater 540, a first channel 552 of a condenser 550, a water extractor 560, a second channel 544 of the reheater 540, an air conditioning turbine 570 and a second channel 554 of the condenser 550. The air conditioning turbine 570 is mechanically connected to the air conditioning compressor 520 by a shaft 580 (i.e., in a bootstrap arrangement, such that the shaft 580 may be referred to as a bootstrap shaft). In the example of FIG. 5, the air cycle line 470 comprises a plurality of heat exchangers (that is, the first heat exchanger 510 and the second heat exchanger 530). However, it will be appreciated that in other examples, the air cycle line 470 may comprise only a single heat exchanger (that is, either the first heat exchanger 510 or the second heat exchanger 530).

In use, the flow of air provided to the air cycle line 470 is first drawn through the first heat exchanger 510 and subsequently provided to the air conditioning compressor 520. Heat is rejected from the flow of air within the first heat exchanger 510, such that the flow of air is cooled therein. The first heat exchanger 510 may reject heat to ambient air, for example, in which case the first heat exchanger may be referred to as a first air-to-air heat exchanger. In particular, the first heat exchanger 510 may be at least partially disposed within a ram air duct of an aircraft, such that the first heat exchanger 510 rejects heat to ambient air drawn through the ram air duct of the aircraft.

The air conditioning compressor 520 is generally configured to compress the flow of air within the air cycle line 470 by converting kinetic energy of the flow of air into pressure energy and heat energy. The air conditioning compressor 520 may be any suitable type of compressor. The air conditioning compressor 520 may preferably be a centrifugal compressor. As a consequence of the compression process, a pressure and/or a temperature of the flow of air within the air cycle line 470 discharged from the air conditioning compressor 520 is significantly higher than a pressure and/or a temperature of the flow of air provided to the air conditioning compressor 520. As described below, the air conditioning compressor 520 may be at least partially driven by the air conditioning turbine 570.

The flow of air within the air cycle line 470 which has been discharged by the air conditioning compressor 520 is then provided to the second heat exchanger 530 through which the flow of air is conveyed. Heat is rejected from the flow of air within the second heat exchanger 530, such that the flow of air is cooled therein. The second heat exchanger 530 may reject heat to ambient air, for example, in which case the second heat exchanger 530 may be referred to as a second air-to-air heat exchanger 530. Further, it may be that the second heat exchanger 530 is at least partially disposed within a ram air duct of an aircraft, such that the second heat exchanger 530 rejects heat to ambient air drawn through the ram air duct of the aircraft.

The flow of air within the air cycle line discharged from the second heat exchanger 530 is then passed through the first channel 542 of the reheater 540. The flow of air is further cooled within the first reheater channel 542 and is subsequently provided to the first condenser channel 552 of the condenser 550 in which the flow of air is further cooled such that the temperature of the flow of air within the first condenser channel 552 falls below the dew point at which moisture within the flow of air condenses and water droplets are formed within the flow of air. As described in further detail below, the flow of air within the first reheater channel 542 is regeneratively cooled by the flow of air within a second reheater channel 544 while the flow of air within the first condenser channel 552 is cooled by the flow of air within the second condenser channel 554.

The flow of air is then passed through the water extractor 560 in which water droplets within the flow of air are removed prior to being supplied to further components of the air cycle line 470. The water extractor 560 may be, for example, a cyclonic separator or the like. In any example, the water extractor 560 may comprise a plurality of swirl vanes configured to extract liquid water droplets from the flow of air by making use of a centrifugal effect. The water extractor 560 may be further configured to discharge the extracted water onto the secondary heat exchanger 530 to assist in its cooling function.

Next, the flow of air is provided to the second reheater channel 544 in which the flow of air regeneratively receives heat from the flow of air within the first reheater channel 542 before being provided to the air conditioning turbine 570. The air conditioning turbine 570 is generally configured to expand the flow of air within the air cycle line 470 by converting pressure energy and heat energy of the flow of air into kinetic energy. In addition, the air conditioning turbine 570 is configured to extract mechanical work from the flow of air within the air cycle line 470 and to drive the air conditioning compressor 520 via the bootstrap shaft 580. The air conditioning turbine 570 may be any suitable type of turbine. As a consequence of the expansion process, a pressure and/or a temperature of the flow of air within the air cycle line 470 discharged from the air conditioning turbine 570 is significantly lower than a pressure and/or a temperature of the flow of air provided to the air conditioning turbine 570.

The flow of air in the air cycle line 470 which has been discharged from the air conditioning turbine 570 is then conveyed through the second condenser channel 554 of the condenser 550 in which the flow of air is heated by the flow of air within the first condenser channel 552 such that the temperature of the flow of air within the second condenser channel 554 rises prior to being discharged for supply to the airframe system 450. Finally, the flow of air is discharged from the second condenser channel 554 for supply to the airframe system 450. In some examples, the air treatment apparatus 460 is configured to mix air from the air cycle line 470 at a location which is downstream of the second condenser channel 554. In various examples, it may be that the air treatment apparatus 460 is configured to mix air from the air cycle line 470 with air from the bypass line 480 at a location between the air conditioning turbine 570 and the second condenser channel 554 so as to control the temperature of air for discharge to the airframe system 450.

Figure 6:
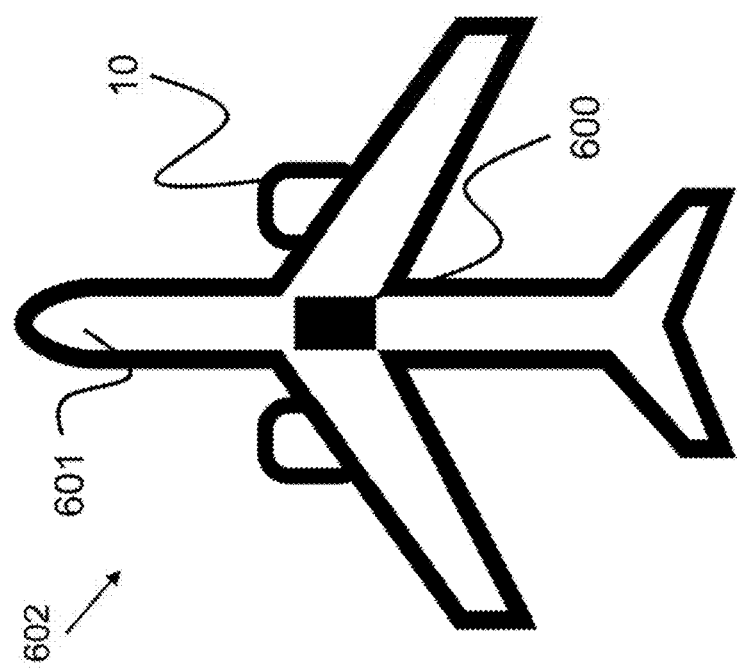
FIG. 6 shows an aircraft comprising an air pressurisation system and a gas turbine engine.

FIG. 6 shows an aircraft 602 comprising an airframe 601 and a gas turbine engine. The aircraft comprises 602 an air pressurisation system 600. The air pressurisation system may be in accordance with the first example air pressurisation system 400 described with respect to FIG. 4A or the second example air pressurisation system 400' described with respect to FIG. 4B. The gas turbine engine may be in accordance with the gas turbine engine 10 described above with reference to FIGS. 1 to 3.

Figure 7:
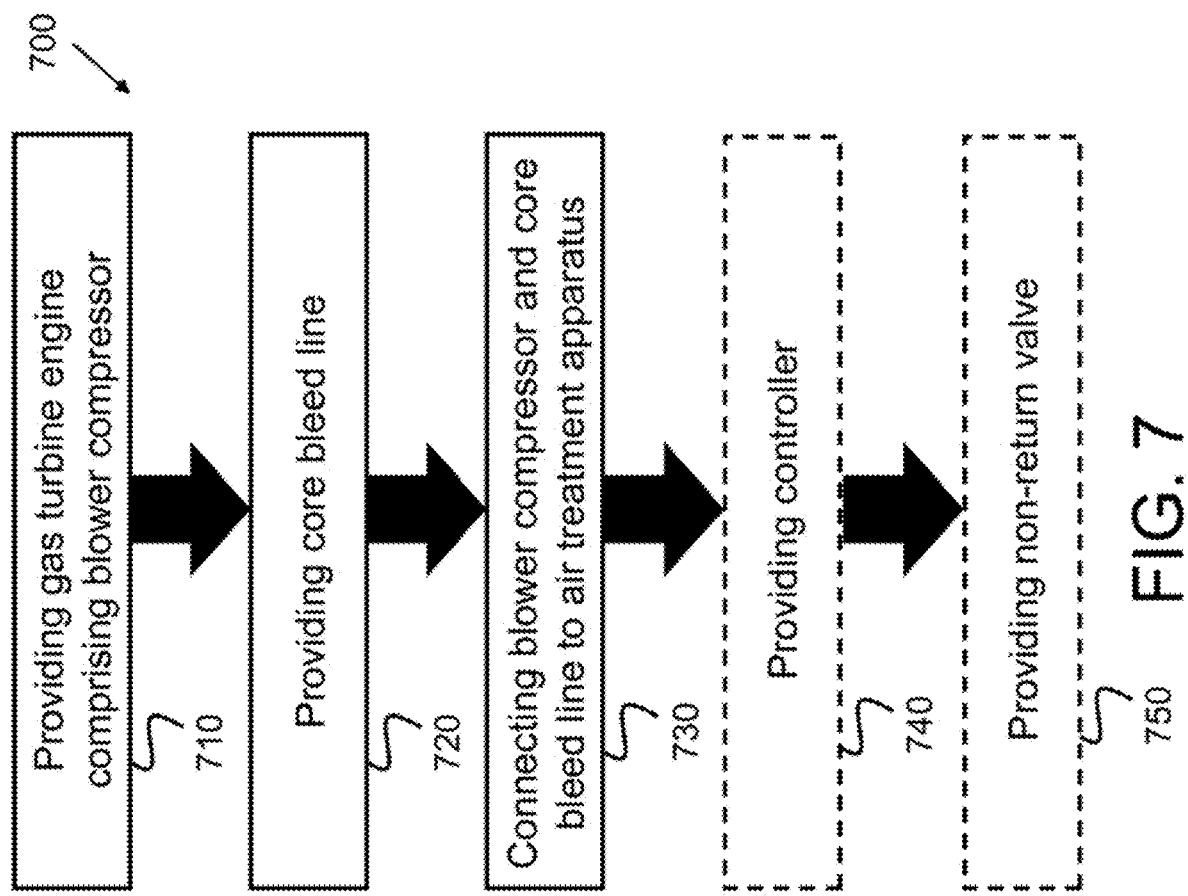
FIG. 7 is a flowchart which shows a method of providing an air pressurisation system in accordance with the first or second example air pressurisation systems of FIG. 4A and FIG. 4B respectively.

FIG. 7 is a flowchart which shows a method 700 of providing an air pressurisation system in accordance with the first example air pressurisation system 400 or the second example air pressurisation system 400' described above with reference to FIG. 4A and FIG. 4B respectively.

The method 700 commences at block 710, which includes providing a gas turbine engine comprising a blower compressor 420 which is mechanically coupled to a spool of the gas turbine engine and which is configured to receive a first inlet flow of air from a bypass duct of the gas turbine engine. The gas turbine engine may be in accordance with the gas turbine engine 10 described above with reference to FIGS. 1 to 3.

The method 700 continues to block 720, which comprises providing an engine core bleed line 710 which is configured to receive a second inlet flow of air from a compressor 412 of the gas turbine engine.

The method 700 further comprises block 730, which includes connecting the blower compressor 420 and the engine core bleed line 710 to an air treatment apparatus 460 of an airframe 601. The air treatment apparatus 460 comprises an air cycle line 470 which is configured to condition air provided to the air treatment apparatus 460. The air treatment apparatus 460 further comprises a bypass line 480 configured to receive air provided to the air treatment apparatus 460 and to bypass the air cycle line 470. The air treatment apparatus 460 is configured to mix air from the air cycle line 470 with air from the bypass line 480 to control a temperature of air for discharge to an airframe system 450.

In block 730, the blower compressor 420 and the core bleed line 410 are connected so that the air cycle line 470 is configured to condition air received from the blower compressor 420 and so that the second inlet flow of air is configured to be provided to the air treatment apparatus 460 without passing through a precooler or the blower compressor 420 in an augmented supply mode of the air pressurisation system 400. Further, the blower compressor 420 and the core bleed line 410 are connected so that either the second inlet flow of air is provided directly to the bypass line 480 or so that the second inlet flow of air is mixed with air from the blower compressor 420 upstream of the bypass line 480 and then provided to the air cycle line 470.

Optionally, the method 700 continues to block 740, which comprises providing a controller 490 configured to selectively control a control valve 414 on the core bleed line 410 to selectively operate the air pressurisation system 400 in either the augmented air supply mode in which the control valve 414 is open or an unaugmented air supply mode in which the control valve 414 is closes to prevent flow of the second inlet flow of air to the air treatment apparatus 460. Also at block 740, the gas turbine engine may be provided with any other feature of the first example air pressurisation system 400 described above with reference to FIG. 4A or the second example air pressurisation system 400 described above with reference to FIG. 4B which is outside of the air treatment apparatus 460. Such features may be located within the airframe 601 but functionally provided to the gas turbine engine.

If the core bleed line 410 is connected to the air treatment apparatus 460 at block 730 so that the second inlet flow of air is provided directly to the bypass line 480, the method 700 may further comprise block 750. Block 750 comprises providing a non-return valve 486 to the bypass line 480 which is configured to prevent the second inlet flow of air from flowing along the bypass line 480 toward the air cycle line 460 and/or the blower compressor 420. The method 700 may proceed directly from block 730 to block 750, or the method 700 may proceed from block 730 to block 740 and then to block 740.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

The invention claimed is:

1. An air pressurisation system for an aircraft, comprising:
a blower compressor configured to be mechanically coupled to a spool of a gas turbine engine and configured to receive a first inlet flow of air from a bypass duct of the gas turbine engine;
an air treatment apparatus comprising:
an air cycle line configured to condition air received from the blower compressor; and
a bypass line for receiving air from the blower compressor, and configured to bypass the air cycle line;
wherein the air treatment apparatus is configured to mix air from the air cycle line with air from the bypass line to control a temperature of air for discharge to an airframe system; and
a core bleed line configured to provide a second inlet flow of air from a compressor of the gas turbine engine to the air treatment apparatus in an augmented air supply mode of the air pressurisation system;
wherein the core bleed line is further configured to:
provide the second inlet flow of air directly to the bypass line.

2. An air pressurisation system according to claim 1, wherein the core bleed line is configured to provide the second inlet flow of air to the air treatment apparatus without passing the second inlet flow of air through a precooler or the blower compressor.

3. An air pressurisation system according to claim 1, further comprising a controller configured to control a control valve disposed on the core bleed line and thereby selectively operate the air pressurisation system in:
the augmented air supply mode in which the valve is open, or
an unaugmented air supply mode in which the valve is closed to prevent the second inlet flow of air to the air treatment apparatus.

4. An air pressurisation system according to claim 3, wherein the controller is configured to:
receive a flow demand signal and to determine whether a flow delivery capacity of the air pressurisation system in the unaugmented mode is sufficient to meet a flow demand corresponding to the flow demand signal;

switch the air pressurisation system into the augmented air supply mode in response to a determination that the flow delivery capacity is insufficient to meet the flow demand.

5. An air pressurisation system according to claim 4, wherein the controller is configured to switch the air pressurisation system into the unaugmented air supply mode in response to a determination that the flow delivery capacity of the air pressurisation system in the unaugmented air supply mode is sufficient to meet the flow demand.

6. An air pressurisation system according to claim 4, wherein the controller is configured to determine whether the flow delivery capacity of the air pressurisation system in the unaugmented mode is sufficient to meet the flow demand signal by reference to a flow delivery capacity model configured to predict the flow delivery capacity based on one or more of:
   a rotational speed of the spool of the gas turbine engine;
   a rotational speed of the blower compressor;
   a pressure of a flow through the bypass duct of the gas turbine engine;
   a temperature of the flow through the bypass duct of the gas turbine engine;
   an altitude of the gas turbine engine; and
   an airspeed of the gas turbine engine.

7. An air pressurisation system according to claim 3, configured to prevent supply of the second inlet flow of air at an excessive temperature;
   wherein the control valve and/or a temperature shut-off valve disposed on the core bleed line is configured to close (i) autonomously responsive to receiving air at the excessive temperature and/or (ii) by control of the controller or a dedicated temperature shut-off controller based on a temperature of the second inlet monitored by a core bleed line temperature sensor.

8. An air pressurisation system according to claim 1, wherein there is a non-return valve disposed on the bypass line configured to prevent the second inlet flow of air from flowing along the bypass line toward the air cycle line and/or the blower compressor.

9. An air pressurisation system according to claim 1, wherein the blower compressor is configured to be mechanically connected to the spool of the gas turbine engine via a variable transmission.

10. An air pressurisation system according to claim 1, wherein the blower compressor is configured to be mechanically connected to the spool of the gas turbine engine via an electric variator.

11. An air pressurisation system according to claim 1, wherein the air cycle line comprises a sequential fluid pathway through: a first heat exchanger, an air conditioning compressor, a second heat exchanger, a first channel of a reheater, a first channel of a condenser, a water extractor, a second channel of the reheater, an air conditioning turbine and a second channel of the condenser, and wherein the air conditioning turbine is mechanically connected to the air conditioning compressor by a shaft.

12. An aircraft comprising an airframe and a gas turbine engine, the aircraft comprising an air pressurisation system according to claim 1.

13. An aircraft according to claim 12, wherein the air treatment apparatus is located in the airframe; and the blower compressor is in the gas turbine engine.

14. An aircraft comprising an airframe and a gas turbine engine, the aircraft comprising an air pressurisation system according to claim 3, wherein the air treatment apparatus is located in the airframe, the blower compressor is in the gas turbine engine, and the controller is located in the gas turbine engine.

15. A method of providing an air pressurisation system, comprising:
   providing a gas turbine engine comprising a blower compressor mechanically coupled to a spool of the gas turbine engine and configured to receive a first inlet flow of air from a bypass duct of the gas turbine engine;
   providing a core bleed line configured to receive a second inlet flow of air from a compressor of the gas turbine engine;
   connecting the blower compressor and the core bleed line to an air treatment apparatus of an airframe, the air treatment apparatus comprising:
      an air cycle line configured for conditioning air from the blower compressor;
      a bypass line for receiving air from the blower compressor, and configured to bypass the air cycle line;
      wherein the air treatment apparatus is configured to mix air from the air cycle line with air from the bypass line to control a temperature of air for discharge to an airframe system;
   wherein the blower compressor and the core bleed line are connected so that:
      the air cycle line is configured to condition air received from the blower compressor; and
      the second inlet flow of air is configured to be provided to the air treatment apparatus in an augmented supply mode of the air pressurisation system;
   and so that:
      the second inlet flow of air is provided directly to the bypass line; and
      providing a non-return valve to the bypass line configured to prevent the second inlet flow of air from flowing along the bypass line toward the air cycle line and/or the blower compressor.

16. A method according to claim 15, further comprising providing a controller configured to selectively control a control valve on the core bleed line to selectively operate the air pressurisation system in:
   the augmented air supply mode in which the control valve is open, or
   an unaugmented air supply mode in which the control valve is closed to prevent flow of the second inlet flow of air to the air treatment apparatus.

17. An air pressurisation system for an aircraft, comprising:
   a blower compressor configured to be mechanically coupled to a spool of a gas turbine engine and configured to receive a first inlet flow of air from a bypass duct of the gas turbine engine;
   an air treatment apparatus comprising:
      an air cycle line configured to condition air received from the blower compressor; and
      a bypass line for receiving air from the blower compressor, and configured to bypass the air cycle line;
      wherein the air treatment apparatus is configured to mix air from the air cycle line with air from the bypass line to control a temperature of air for discharge to an airframe system; and
   a core bleed line configured to provide a second inlet flow of air from a compressor of the gas turbine engine to the air treatment apparatus in an augmented air supply mode of the air pressurisation system;
   wherein the core bleed line is further configured to:

provide the second inlet flow of air directly to the bypass line; and wherein there is a non-return valve disposed on the bypass line configured to prevent the second inlet flow of air from flowing along the bypass line toward the air cycle line and/or the blower compressor.

* * * * *